United States Patent [19]

Mayeux et al.

[11] 4,227,082

[45] Oct. 7, 1980

[54] DETECTOR FOR DETECTING IONIZING RADIATION

[75] Inventors: Christian Mayeux; François Micheron, both of Paris, France

[73] Assignee: Thomson-CSF, Paris, France

[21] Appl. No.: 927,822

[22] Filed: Jul. 25, 1978

[30] Foreign Application Priority Data

Jul. 29, 1977 [FR] France .............................. 77 23441

[51] Int. Cl.² ............................................. G01T 1/00
[52] U.S. Cl. ................................... 250/336; 250/370; 250/393; 250/394; 250/445 T
[58] Field of Search ............. 250/336, 272, 338, 390, 250/394, 395, 472, 370, 393, 445 T

[56] References Cited

U.S. PATENT DOCUMENTS

| | | | |
|---|---|---|---|
| 3,831,028 | 8/1974 | Kerlman et al. ...................... | 250/336 |
| 3,861,199 | 1/1975 | Barkhoudarian ................ | 250/272 X |
| 3,991,313 | 11/1976 | Leschek .............................. | 250/390 |
| 4,028,548 | 6/1977 | Scott ...................,............ | 250/338 X |
| 4,149,075 | 4/1979 | Drukier et al. ....................... | 250/336 |

*Primary Examiner*—Davis L. Willis
*Attorney, Agent, or Firm*—Cushman, Darby & Cushman

[57] ABSTRACT

The detector comprises at least one plate of an electrooptical material having good photoconduction properties and high absorption of X- or γ-rays, preferably materials comprising bismuth oxide. The plate is placed between two electrodes connected to an electric generator through a resistor. A polarized luminous beam passes through the plate. Under the action of the radiation, the conductivity of the plate varies and produces a modification of the polarization state of the luminous beam. This modification is analysed and then detected. In this way there is obtained an indication of the radiation dose received for a given period.

13 Claims, 13 Drawing Figures

DETECTOR FOR DETECTING IONIZING RADIATION

The invention relates to the detection of an ionizing radiation mainly high energy X-rays, so as to effect a dosing of radiation or a measurement of the transparence of an object to this radiation.

Ionization chambers are usually employed for detecting X-rays but these devices have a low absorption and must therefore have considerable thickness. Moreover, as the time of propagation of the ions is relatively long, the information provided lags behind the emission by several ms. Scintillating crystals associated with a photomultiplier are also used for counting X-rays, which results in a complex, expensive and large device. Moreover, these devices are sensitive to vibrations.

An object of the invention is to overcome these drawbacks and to provide a detector which is extremely sensitive, even to very high energy photons, at a small thickness. Consequently, it is possible to assemble a large number of detecting units and obtain a large viewing angle. This possibility of a high degree of integration is of particular advantage in the application in tomodensitometry since it enables the exposure time and the radiation dose received to be decreased. For this purpose there are employed materials which are highly absorbent of X-rays and little absorbent of visible rays and have good photoconduction properties, in particular bismuth oxide and the compounds thereof. The conductivity of these materials is an increasing function of the flux of rays received and if a current generator is connected between two electrodes disposed on two of its sides, the voltage at the terminals of the plate employed decreases when the flux of photons increases. One of the features of the invention resides in the fact that this voltage variation is measured by means of the variation in the electric birefringence observed when the chosen material is electro-optical. In fact, the materials employed for carrying out the invention must have high electro-optical coefficients which is the case of compounds based on bismuth oxide. With the crystal mounted between crossed polarizer and analyser, a light detector can detect the variation in the intensity of an analysing luminous beam having a wavelength $\lambda_0$ for which the coefficient of absorption of the material is low. This variation in intensity is a function of the ionizing radiation flux.

According to the present invention, there is provided a detector for detecting ionizing radiation, comprising at least one ponctual detecting unit, said unit comprising a plate of an electro-optical material arranged to receive an homogeneous beam of said radiation, said plate being capable of absorbing the most part of said radiation, the resistivity of said material being variable with respect to the intensity of said most part; said unit further comprising two electrodes arranged on opposite faces of said plate parallel to said beam of radiation and forming a capacitor; said detector further comprising electrical means supplying a constant current between said two electrodes, the voltage between said two electrodes being dependent upon the resistivity of said material and creating an electrical birefringence in said plate; said detector further comprising optical means for emitting a luminous beam of polarized light in the direction of said plate, polarization analysing means receiving the light emerging from said plate, and photodetecting means receiving the light transmitted by said analysing means.

There is also provided a device for examining an object interposed between the source of radiation and said detector, the transparence of said object in respect of said radiation being spatially variable.

A better understanding of the invention will be had from the ensuing description with reference to the drawings in which.

Figure 1:
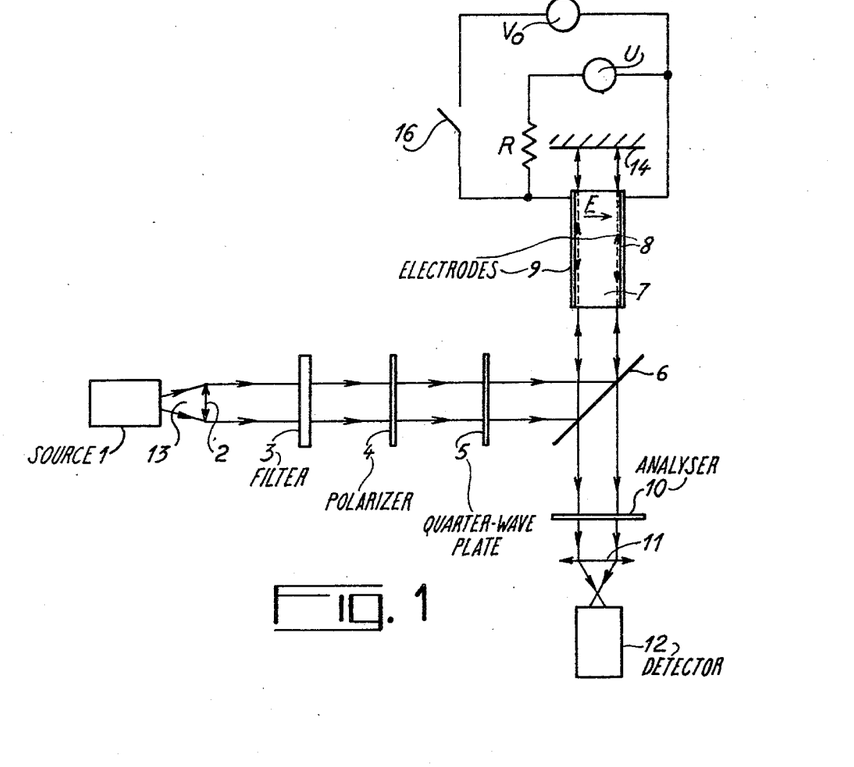
FIG. 1 represents a detecting unit according to the invention.

FIG. 1 shows a unit for detecting an ionizing radiation according to the invention. It comprises a luminous source 1, for example an electroluminescent diode or a laser which emits a luminous beam 13. The beam passes through a lens 2 which renders the beam parallel and a monochromator filter 3 which renders it monochromatic with a wavelength $\lambda_0$. The lens and the filter are not necessary when the source 1 is a laser since this directly provides a monochromatic and parallel luminous beam. There are then disposed in the path of the luminous beam a polarizer 4, a quarterwave plate 5 and a semitransparent plate 6 which reflects the light toward an electro-optical crystal plate 7. The light emerging from the plate 7 is reflected on a mirror 14 and again passes through the plate 7 in the opposite direction. In this way there is eliminated, if need be, the variation of phase due to the rotatory power of the crystal and the birefringence effect produced by an electric field is doubled. The light this time passes through the semitransparent plate 6, a polarization analyser 10 which is a polarizer crossed with the polarizer 4 and a convergent lens 11 whereby the luminous beam is condensed toward a light detector 12, for example a photodiode or a photomultiplier. An electric birefringence is produced in the plate 7 by an electric field E, for example a transverse electric field, that is to say a field perpendicular to the direction of propagation of the light in the plate. This field is obtained by means of an electric circuit connected between two electrodes 8 and 9 mounted on opposite faces of the plate, said circuit comprising a voltage source U and a resistor R of high value whereby the current variations in the plate are reduced when its conductivity varies.

The orientations of the axes of the polarizer and analyser depend on the type of crystal employed and are determined in accordance with its optical axes. The quarterwave plate produces a fixed phase shift $\phi_0$ which is added to the phase shift produced by the birefringence of the plate for a forward and return travel of the luminous beam and which depends on the orientation of the plate with respect to the axes of the crystal. The plate 7 is preferably cut in order to obtain a linear electro-optical coefficient of the highest possible value.

The unit described is adapted to detect an ionizing radiation. For this purpose, the crystal employed must be a good photoconductor and have a coefficient of absorption which is high for the X or γ radiation to be detected and low for the light of wavelength $\lambda_0$ so as to avoid parasitic effect. The radiation to be detected irradiates the plate 7 in the direction perpendicular to the plane of the FIG. 1 and produces a variation in its conductivity. The luminous intensity received by the detector may be put into the form $$I = a I_i \sin^2 (KV + \frac{\phi_o}{2}),$$

in which V is the voltage at the terminals of the plate, the constant K expresses the electro-optical effect and depends on the wavelength $\lambda_0$, on the characteristics of the crystal and on the dimensions of the plate, $I_i$ is the incident luminous intensity issuing from the source 1 and "a" is a coefficient of attenuation owing to losses due to the various components in the path of the luminous beam and to the transmission factor of the semi-transparent plate 6.

Figure 2:
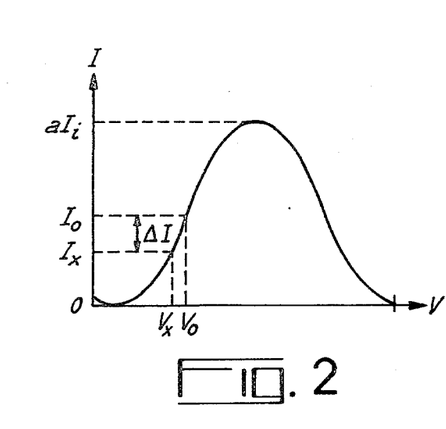
FIG. 2 represents the variations in the luminous intensity as a function of the voltage at the terminals of the plate.

FIG. 2 shows the variations in the intensity I as a function of the voltage V at the terminals of the plate 7. In the absence of irradiation, this voltage V has the magnitude $V_o$ and the detected luminous intensity is $I_o$. Upon irradiation, for example by X-rays, the conductivity of the plate increases so that the voltage at its terminals decreases and becomes $V_x$ which depends on the flux of photons X, Φ, which is to be measured. The luminous intensity is then $I_x$ and the difference $I_o - I_x = \Delta I$ depends on Φ.

Figure 3:
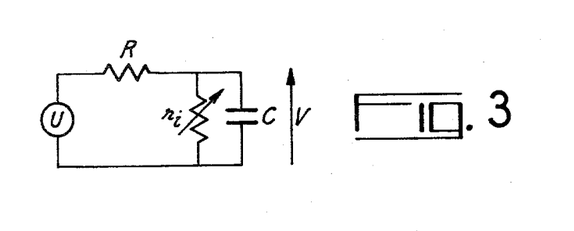
FIG. 3 is the equivalent electric diagram of the polarized crystal.

FIG. 3 represents the simplified equivalent electric diagram of the unit. The plate 7 is equivalent to a capacitor C and a resistance $r_i$ which varies with the flux of the radiation, C and $r_i$ being connected in parallel. In the absence of radiation, $r_i = r_{io}$ and the voltage V at the terminals of the plate when the capacitor is completely discharged is $$V_o = \frac{r_{io}}{r_{io} + R} U.$$

Upon irradiation, $r_i = r_{ix}$; the variation in the conductivity is proportional to the flux Φ. The voltage V decreases from $V_o$ exponentially with a time constant $t_x$ related to $$r_{ix}: t_x = r_{ix} C \frac{R}{R + r_{ix}}.$$

Figure 4A:
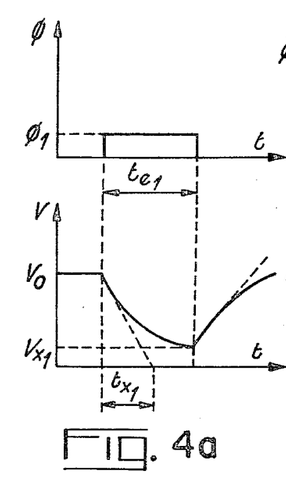
FIGS. 4a, 4b, 4c and 5 are diagrams explaining the operation of the unit.
Figure 4B:
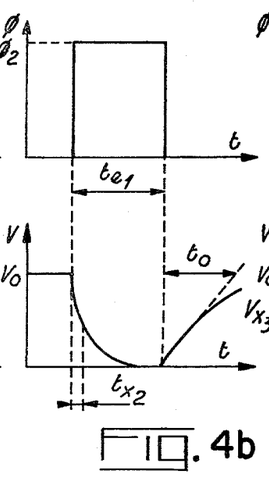
Figure 4C:
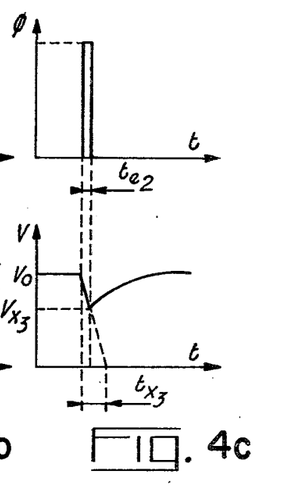

The decrease is therefore all the more rapid as the resistance $r_{ix}$ is low, that is to say as the flux Φ is high. FIGS. 4a, 4b and 4c show, in three cases, the variation in the voltage V when the unit is irradiated by a flux Φ during a time $t_e$. At (FIG. 4a), the flux is low and has the magnitude $\Phi_1$ and the time $t_e$ is $t_{e1}$. The voltage V decreases from $V_o$ with a descent time $t_{x1}$ which is assumed to be less than the period of irradiation $t_{e1}$. At the end of time $t_{e1}$, the voltage V has dropped to a value $V_{x1} < V_o$. When the irradiation stops, the voltage V increases exponentially from $V_{x1}$ to V with a constant $$t_o = r_{io} C \frac{R}{R + r_{io}}$$

which is greater than $t_{x1}$. At (FIG. 4b), the flux is $\Phi_2 > \Phi_1$. It is clear that the decrease is more rapid: $t_{x2} < t_{x1}$. At the end of time $t_{e1}$, the voltage V is very low. After irradiation stops, the time constant $t_o$ is unchanged. At (FIG. 4c), the time of irradiation is $t_{e2}$, which is very short and less than the constant $t_{x2}$. The decrease of V is then roughly linear between $V_o$ and $V_{x3}$.

Figure 5:
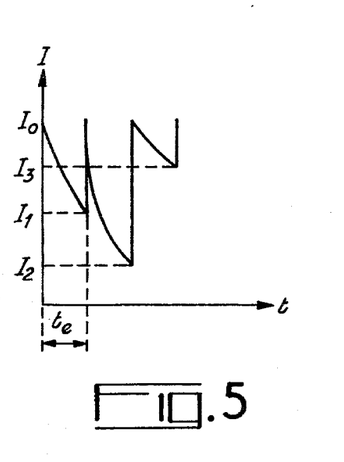

To measure the flux Φ, it is desirable to obtain variations in the detected luminous intensity as a function of Φ which are as linear as possible. FIG. 2 shows that it is preferable to arrange that $KV_o + (\phi_o/2) = \pi/4$ so as to obtain a linear variation of I. For the same reason, $\Delta I/I$ and therefore $(V_o - V_x)/V_o$ must be rather small. Moreover, FIGS. 4a, 4b and 4c show that the decrease of V is roughly linear with respect to time if $t_o < t_x$. Consequently, a measurement will preferably be made by sampling. For this purpose, the voltage at the terminals of the plate is periodically reestablished at the value $V_o$ by means of the voltage source $V_o$ and the switch 16 shown in FIG. 1. There is then obtained the luminous intensity variation curve shown in FIG. 5 where it is assumed that the flux Φ varies with respect of time. The sampling time is $t_e$. During this time, the variation of intensity I is roughly linear and the variations $I_o-I_1$, $I_o-I_2$, $I_o-I_3$ ... obtained at the end of each sampling are proportional to the flux Φ which irradiated the plate during the time $t_e$. Indeed, it is quite clear that when the variations of I are low, that is to say when $t_x >> t_e$, and if $KV_o + (\phi_o/2) = \pi/4$ we have $$\frac{\Delta I}{I_o} = \frac{2K}{(R + r_o) C} (\frac{\sigma_x}{\sigma_o} - 1) V_o t_e,$$

in which $\sigma_o$ and $\sigma_x$ are values of the conductivity of the plate respectively with and without irradiation. Further, if d is the thickness of the plate in the direction of the flux of X radiation, α its coefficient of absorption, μ and r the mobility and the life time of the carriers created by photoconductivity, q the elementary charge and η the quantic efficiency of the excitation of the charges, if $V_o > d^2/\mu T$, the variation in the conductivity of the crystal is $\sigma_x - \sigma_0 = (\mu/d)\eta q \Phi (1 - e^{-\alpha d})$. In order to obtain maximum sensitivity, the thickness d must be small enough to ensure that all the generated carriers are collected by the electrodes but not too small relative to $1/\alpha$. Further, the sensitivity increases with $V_o$. For a given magnitude of $V_o$, it is always possible adjust the axes of the quarter-wave plate so that $KV_o + (\phi_o/2) = \pi/4$.

Figure 7:
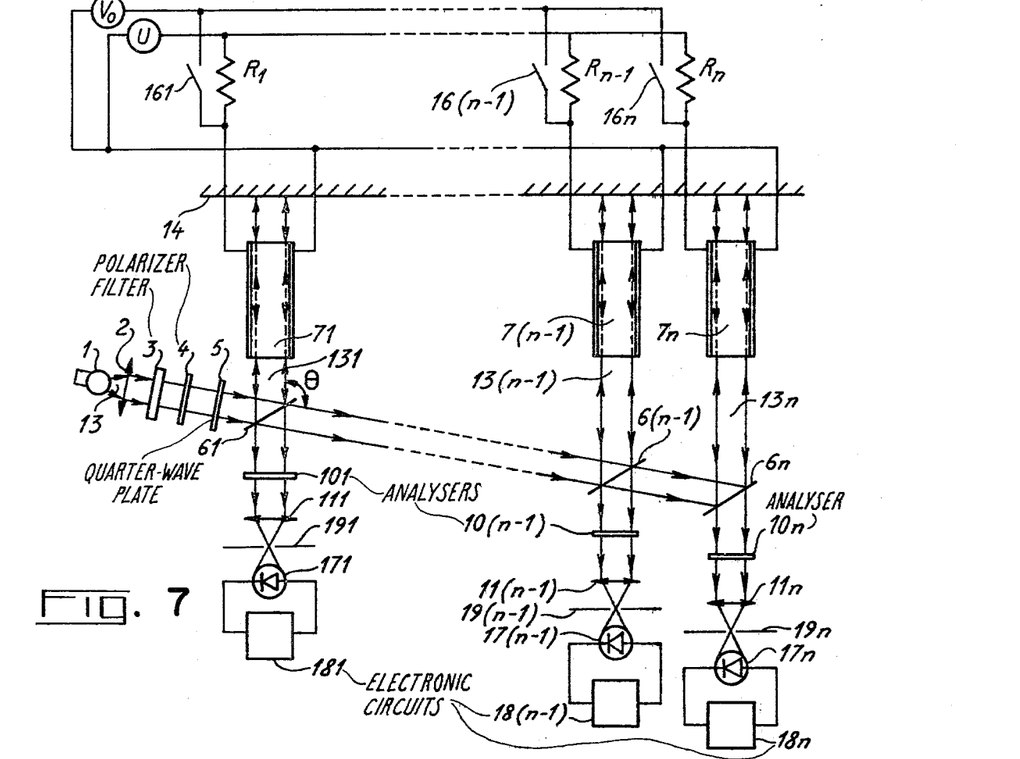
FIGS. 7, 8 and 9 represent embodiments of a detector comprising n units.

The dimensions of the plate will 7 will be chosen in such manner as to conform to the conditions of linearity explained above. It has been shown that the crystal must be electro-optical and a good photoconductor. The materials suitable for the invention are in particular certain oxides of heavy metals which consequently have a high absorption of X- and γ-rays. It concerns in particular bismuth oxide ($Bi_2O_3$) and the compounds thereof in monocrystalline form: bismuth and silicon oxide ($Bi_{12}SiO_{20}$) commonly known as BSO, bismuth and germanium oxide ($Bi_{12}GeO_{20}$) commonly known as BGO. Other materials may also be used although they do not have a coefficient of absorption in respect of high-energy X-photons (on the order of 100 keV) which is as high as the preceding materials. It concerns for example zirconium, lead and lanthanum titanate ($Pb_{1-x}La_xZr_{1-y}Ti_yO_3$) commonly known as PLZT.

This material may be used in the monocrystalline form or polycristalline form. Indeed, polycrystals of PLZT are transparent and have electro-optical and photoconductive properties similar to monocrystals.

Figure 6:
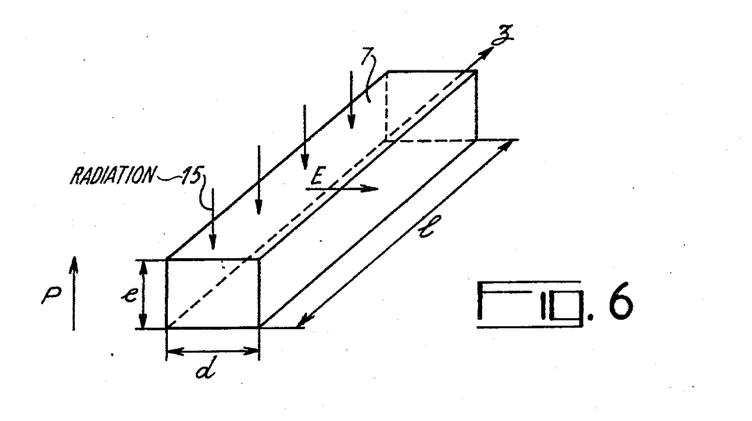
FIG. 6 shows the orientation of the axes of the plate.

In one mode of carrying out the invention, a monocrystalline sample of BSO was used. This material has a high electro-optical coefficient: it was possible to measure $r_{41} = 5 \cdot 10^{-10}$ cm $V^{-1}$; it is highly absorbent in respect of X- and γ-rays: there was measured in respect of X photons having an energy 80 keV a coefficient of absorption $\alpha = 25.7$ cm$^{-1}$, whereas in respect of a wavelength on the order of 0.6 μm, α is around 2 cm$^{-1}$. The product of the mobility and the life of the carriers created by photoconductivity is very high: $\mu\tau = 1.4 \cdot 10^{-7}$ cm$^2$ $V^{-1}$. The plate employed shown in FIG. 6 is cut in the form of a parallel-sided structure with a length in the direction z of propagation of the light: l=1 cm, a width between the electrodes: e=1 mm and a thickness in the direction of the X radiation 15: d=2 mm. The cutting planes are the following: the face of incidence of the light is the face 110, the faces on which the electrodes are disposed are the faces 110, the face receiving the X radiation is 001. The axis of the polarizer 4 is so adjusted as to obtain a polarization P of the light at 45° to the optical axis of the crystal, that is to say perpendicular to the faces 110. The limit of non linearity was established at $10^{-4}$ and the sampling time $t_e$ at 2 ms. The conditions of linearity are conformed to with $R = 10^{13}\Omega$, $r_o = 10^{17}\Omega$, $r_x = 10^{13}\Omega$, for a flux $\Phi = 3 \cdot 10^9$ cm$^{-2}S^{-1}$ of photons of 80 keV, which gives $\Delta I/I_o = 6.3 \cdot 10^{-7}$ $V_o$, namely $1.25 \cdot 10^{-3}$ for $V_o = 2,000$ V. As the equivalent noise power of the light detector constituted by a photodiode and an amplifier is about $10^{-10}$ W, to obtain a variation $\Delta I$ greater than $10^4$ times the noise power, it is necessary that $I_o = 0.8$ mW, namely an incident power of the luminous source $I_i = 6.5$ mW if the coefficient of attenuation a is reckoned to be ⅛. To effect a precise measurement of the flux $\Phi$, it is preferable to effect a measurement in the absence of radiation which enables the parasitic photoconductivity to be taken into account. FIG. 7 shows an embodiment of a point detector of X- or γ-rays constructed from a large number of units similar to that shown in FIG. 1 placed next to each other and all irradiated by a flux of ionizing rays which are oriented in a direction perpendicular to the plane of the Fig. It comprises n identical units with a common optical luminous source 1 which supplies a luminous beam 13 which is split up by a set of semi-transparent plates 61 to 6n into n beams 131 to 13n, which illuminate respectively n identical plates 71 to 7n of an electro-optical and photoconductive crystal supporting two electrodes. The lens 2, the monochromotor filter 3, the polarizer 4 and the quarter-wave plate 5 are disposed in front of semitransparent plates and are therefore common to the n units. A single mirror 14 has also been placed behind the crystalline plates. Disposed in the paths of each of the n beams reflected by the mirror 14 are respectively analysers 101 to 104, convergent lensses 111 to 11n, diaphragms 191 to 19n, photodiodes 171 to 17n connected to electronic circuits 181 to 18n. It can be seen that the incident luminous beam 13 makes an angle $\Phi$ greater than 90° with the axes of the beams 131 to 13n so as to avoid measuring on a photodiode belonging to a given unit a part of the signal coming from another unit. The diaphragms 191 to 19n also serve to avoid any interference between the luminous beams of the different units. As before, each plate is connected to a circuit comprising for example a resistor (respectively $R_1$ to $R_n$) and a voltage source V common to all the units, all the resistors $R_1$ to $R_n$ being equal. The periodic resetting to zero is achieved by the closure of switches 161 to 16n onto another single source of voltage $V_o$. The width d of each plate is determined in accordance with the desired spatial resolution. A pitch of 2 mm may be envisaged. Their length l then depends on the intensity of the flux to be detected, the sampling time and the number of units which are part of the detector.

Figure 8:
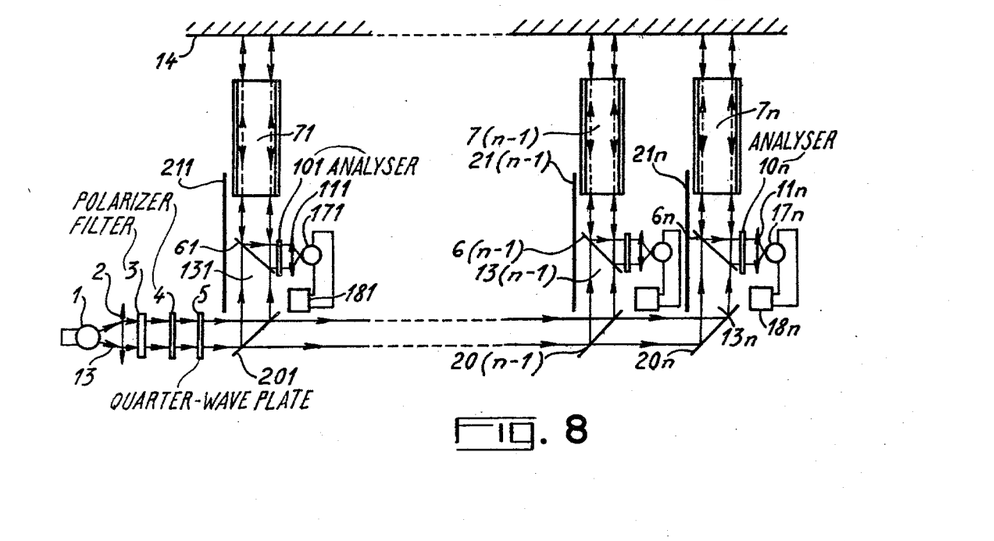

Other embodiments of a point detector may be envisaged with the use of the described unit and having the same characteristics. FIG. 8 shows another embodiment of the detector. The luminous source 1, the filter 2, the polarizer 3, the quarter wave plate 4 and the mirror 14 are here again common to all the units. The incident beam 13 is divided into n beams 131 to 13n, by means of n semitranspatent plates 201 to 20n which are separate from the n other plates 61 to 6n which serve to direct the n beams reflected by the mirror toward the n photodiodes 171 to 17n. The incident beam 13 may make an angle of 90° with the axes of the beams 131 to 13n, which reduces the overall size relative to the embodiment shown in FIG. 7. The diaphragms 191 to 19n of FIG. 3 are no longer necessary but screens 211 to 21n are employed to avoid any interference between the beams. The polarization circuits of the plates 71 to 7n are unchanged and are not shown in FIG. 8.

Figure 9:
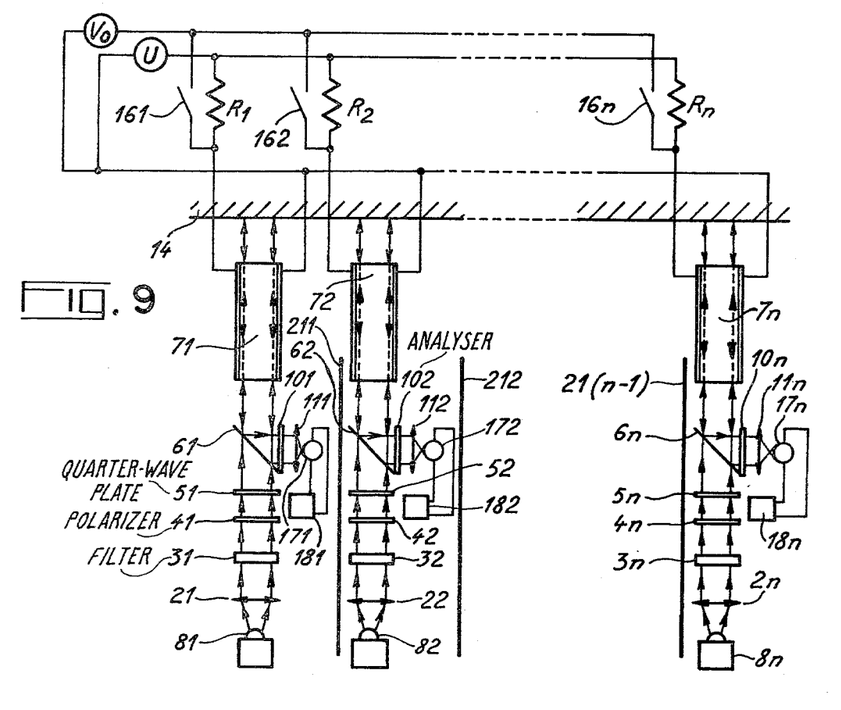

FIG. 9 shows a third embodiment of the detector according to the invention in which there is one light source per unit. Each unit consequently comprises, in addition to the plates 71 to 7n, their electric circuits, the semi-reflecting plates 61 to 6n and the components for detecting the light which existed in FIG. 8, the components for emitting the light: respectively light sources 81 to 8n, for example electroluminescent diodes, lensses 21 to 2n, monochromator filters 31 to 3n, polarizers 41 to 4n and quarter-wave plates 51 to 5n. As in FIG. 5, each unit is isolated from the neighbouring units by a screen: 211, 212, . . . 21 (n−1). This embodiment in which there are more components is easier to construct as concerns the alignment of all the components, which alignment was critical in the two preceding embodiments. It moreover permits having the same luminous intensity for the incident beams of each unit, whereas, before, this intensity depended on the coefficient of transmission of each of the light separating plates (61 to 6n in respect of the first embodiment of FIG. 7 and 201 to 20n in respect of the second embodiment of FIG. 8).

Other embodiments of the detector are also possible with the use of n identical units in juxtaposed relation and comprising a light emitting assembly, an electro-optical crystal exposed to an ionizing radiation in respect of which it is photoconductive, an electric circuit and a light detecting assembly. The incident luminous beam or beams may be sent to the crystals by way of optical fibres, which reduces the overall size.

Figure 10:
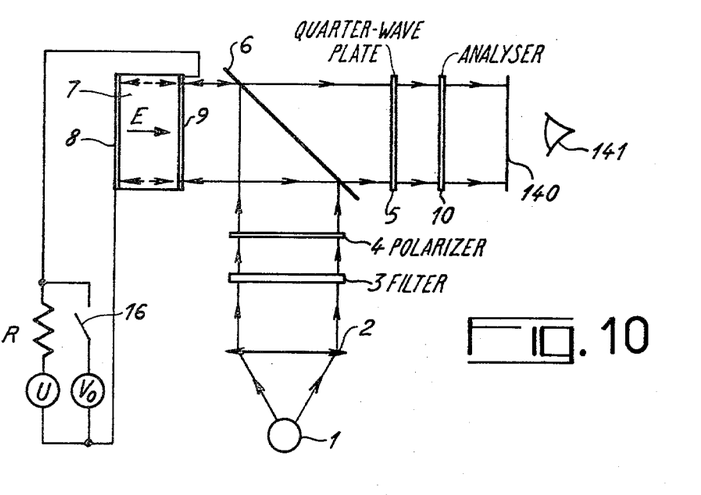
FIG. 10 represents the application of the detector for the dosing of a ionizing radiation.

A detector having a single unit may be employed for measuring an X- or γ radiation dose which may be spatially variable and is received during a given time. It is then unneccessary to proceed by sampling. The electric circuit then comprises only the source of voltage $V_o$ and the switch 16. At the start of the measurement, the switch is closed so that the equivalent capacitor of the plate is charged. The switch is then opened. The capacitor is then discharged with a time constant $r_iC$. The discharge is all the more rapid and therefore the luminous intensity detected is all the weaker as the radiation dose received is large. For a measuring time which is short with respect to $r_{io}C$, the indication given by the light detector of the unit corresponds to the dose received by this unit. $V_o$ and $\phi_o$, the phase shift produced by the quarter-wave plate, may be chosen so that $KV_o+(\phi_o/2)=3\pi/4$. Thus, when the voltage V decreases from $V_o$, the intensity I increases, linearly for short times, and is therefore proportional to the time and to the flux of X or $\gamma$ photons. If a very precise indication of the dose received is not required, the detector may be eliminated and the luminous beam observed directly. Indeed, the eye may be likened to an integrator and if the sampling time exceeds (1/25)s, the luminous impression received by the observer is a function of the flux $\Phi$ received by the unit. A possible diagram for such a unit is shown in FIG. 10 in which the same references as in FIG. 1 have been retained. In this FIG. 10, the case has been chosen in which the longitudinal electro-optical effect and not the transverse optical effect is employed. At least one of the electrodes 7 and 8, namely that fixed to the face of incidence of the luminous beam, must be transparent. The other may be fully reflective, which eliminates the mirror 14. A frosted screen 140 is placed behind the analyser 10 to permit an optical reading by an observer 141.

Figure 11:
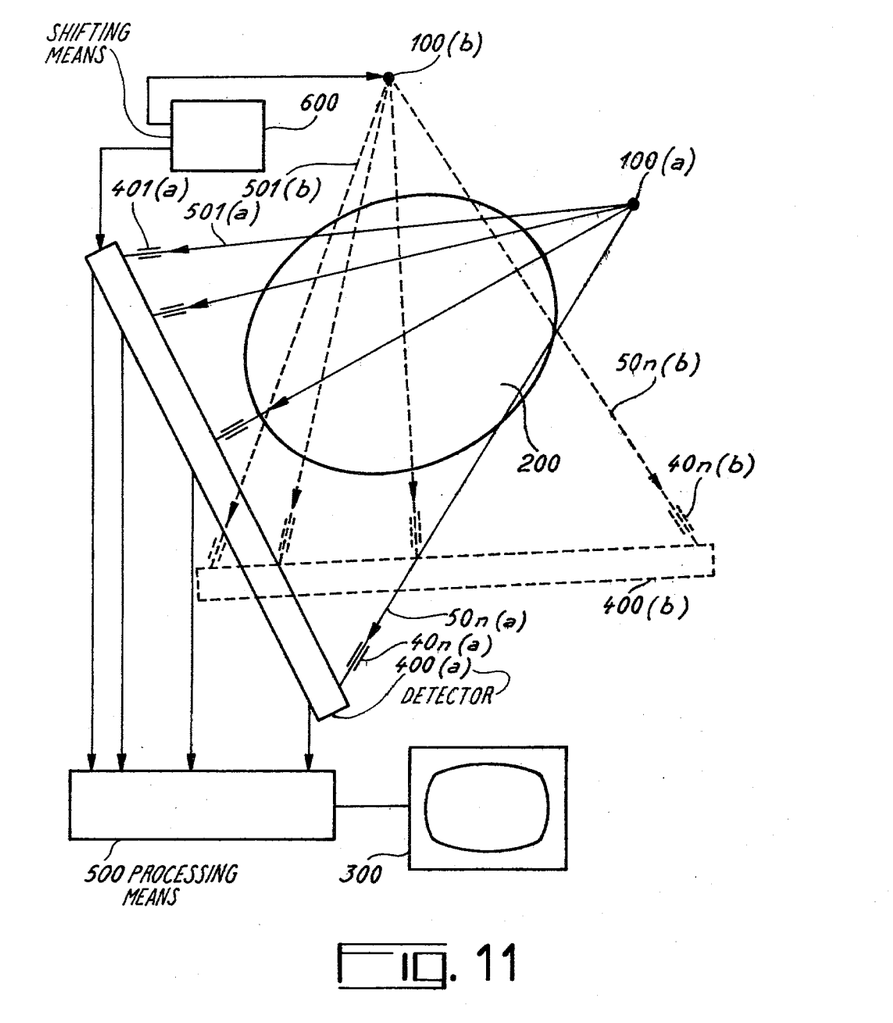
FIG. 11 represents a tomodensitometer device according to the invention.

A second type of application of the invention is the measurement of the spatially variable transparence of an object to an ionizing radiation. A detector comprising a large number of units such as one of those shown in FIGS. 7, 8, and 9 is then of particular interest since it enables the viewing angle to be increased and the duration of the exposure of the object to the radiation to be decreased. FIG. 11 shows a tomodensitometer device comprising a detector according to the invention. A source 100 of X-rays irradiates a section of an object 200. The assembly of the device is shown in plan. By shifting the object, different sections of the object may be examined. The source 100 is associated with an X-ray detector 400 having n detecting units. The source and the detector are made to undergo a simultaneous rotary motion by shifting means 600. The source and the detector are shown in two positions (a) and (b), one being in full lines and the other in dotted lines, which gives, for the position (a), the source 100 (a) and the detector 400 (a), and for the position (b), the source 100 (b) and the detector 400 (b). The source 100 emits a beam of X-rays which may be split up into n beams 501 to 50n only some of which have been shown. These beams are defined respectively by collimators 401 to 40n so as to irradiate each unit through the object. Corresponding to each position of the source and detector, is a plurality of n absorption measurements of a portion of the section 200. The n measurements, which are usually in the form of electric signals, are sent to a storing and calculating means 500. It can be seen that when the source has effected a complete rotation or a part of a rotation around the object, there are obtained a large number of measurements relating to the absorption of the object at different angles. With these measurements, the means 500 determines the absorption of the X-rays at each point of the section 200 with a resolving power which depends on the number of measurements. For example, for a number of units n=30, a sampling time $t_e=2$ ms, and a total exposure time of 1s, there are 15,000 measurements.

What we claim is:

1. A detector for detecting ionizing radiation, comprising at least one point detecting unit, said unit comprising a plate of an electro-optical material arranged to receive an homogeneous beam of said radiation, said plate being capable of absorbing the most part of said radiation, the resistivity of said material being variable with respect to the intensity of said most part; said unit further comprising two electrodes arranged on opposite faces of said plate parallel to said beam of radiation and forming a capacitor; said detector further comprising electrical means supplying a constant current between said two electrodes, the voltage between said two electrodes being dependent upon the resistivity of said material and creating an electrical birefringence in said plate; said detector further comprising optical means for emitting a luminous beam of polarized light in the direction of said plate, polarization analysing means receiving the light emerging from said plate, and photodetecting means receiving the light transmitted by said analysing means.

2. A detector as claimed in claim 1, wherein said luminous beam passes through the plate in the direction parallel to the electrodes.

3. A detector as claimed in claim 1, wherein said luminous beam passes through the plate in a direction perpendicular to the electrodes, at least one of the electrodes being transparent in respect of said beam.

4. A detector as claimed in claim 3, further comprising reflecting means placed on the path of said luminous beam after a first passage through the plate, said luminous beam being reflected by said reflecting means and passing again through said plate in the opposite direction after reflection.

5. A detector as claimed in claim 4, wherein said reflecting means are constituted by the second of the electrodes.

6. A detector as claimed in claim 1, wherein said electrical means comprise switching means for periodically returning the voltage between the electrodes to a magnitude equal to the equilibrium voltage existing when there is no radiation.

7. A detector as claimed in claim 1, wherein said material is bismuth oxide.

8. A detector as claimed in claim 1, wherein said material is bismuth and silicon oxide.

9. A detector as claimed in claim 1, wherein said material is bismuth and germanium oxide.

10. A detector as claimed in claim 1, wherein said luminous beam is monochromatic.

11. A detector as claimed in claim 1, comprising n units and wherein said optical means comprise a source of a first polarized luminous beam and semireflecting plates dividing said first beam between n secondary beams respectively transmitted the plates of said n units.

12. A detector as claimed in claim 1, comprising n units and wherein said optical means comprise n luminous sources.

13. A device for examining an object, said object being non transparent in respect of ionizing radiation, said device comprising a. a source of ionizing radiation,
a detector for detecting ionizing radiation, comprising at least one point detecting unit, said unit comprising a plate of an electro-optical material arranged to receive an homogeneous beam of said radiation, said plate being capable of absorbing the most part of said radiation, the resistivity of said material being variable with respect to the intensity of said most part; said unit further comprising two electrodes arranged on oppcsite faces of said plate parallel to said beam of radiation and forming a capacitor; said detector further comprising electrical means supplying a constant current between said two electrodes, the voltage between said two electrodes being dependent upon the resistivity of said material and creating an electrical birefringence in said plate; said detector further comprising optical means for emitting a luminous beam of polarized light in the direction of said plate, polarization analysing means receiving the light emerging from said plate, and photodetecting means receiving the light transmitted by said analysing means, c. shifting means mechanically connected to said source of ionizing radiation and said detector, said detector receiving the part of radiation transmitted by said object and providing data relative to the absorption of said radiation by said object in a plurality of rectilinear paths.

* * * * *